United States Patent
Kneller

(10) Patent No.: US 7,786,694 B2
(45) Date of Patent: Aug. 31, 2010

(54) CONVERTER SYSTEM, METHOD, AND CONVERTER

(75) Inventor: Klaus Kneller, Ubstadt-Weiher (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 0 days.

(21) Appl. No.: 10/510,562

(22) PCT Filed: Mar. 11, 2003

(86) PCT No.: PCT/EP03/02465

§ 371 (c)(1),
(2), (4) Date: Oct. 7, 2004

(87) PCT Pub. No.: WO03/085818

PCT Pub. Date: Oct. 16, 2003

(65) Prior Publication Data

US 2005/0146305 A1    Jul. 7, 2005

(30) Foreign Application Priority Data

Apr. 10, 2002 (DE) ................... 10215822

(51) Int. Cl.
*H02P 27/04* (2006.01)

(52) U.S. Cl. .............. 318/800; 318/762; 318/801; 318/375; 318/376

(58) Field of Classification Search ............ 318/700, 318/703, 727, 729, 730, 757, 759, 762, 795, 318/798, 800, 254.1, 273, 375, 376, 430
See application file for complete search history.

(56) References Cited

U.S. PATENT DOCUMENTS

| | | | | |
|---|---|---|---|---|
| 4,061,948 A | * | 12/1977 | Lamparter | 318/87 |
| 4,286,194 A | * | 8/1981 | Sherman | 315/209 R |
| 4,904,918 A | * | 2/1990 | Bailey et al. | 318/762 |
| 4,992,925 A | * | 2/1991 | Meyer | 363/141 |
| 5,552,681 A | * | 9/1996 | Suzuki et al. | 318/139 |
| 5,580,221 A | * | 12/1996 | Triezenberg | 417/44.2 |
| 5,614,796 A | | 3/1997 | Minderlein et al. | |
| 5,631,813 A | * | 5/1997 | Ikeshita | 363/37 |
| 5,669,294 A | | 9/1997 | Klemm et al. | |
| 5,907,191 A | * | 5/1999 | Sasaki et al. | 290/19 |
| 5,998,880 A | * | 12/1999 | Kumar | 290/40 B |
| 6,367,273 B2 | * | 4/2002 | Takagi et al. | 62/230 |
| 6,483,198 B2 | * | 11/2002 | Schmitz et al. | 290/40 C |
| 6,518,736 B2 | * | 2/2003 | Sasaki et al. | 322/16 |
| 6,522,099 B2 | * | 2/2003 | Tominaga et al. | 318/801 |
| 6,630,804 B2 | * | 10/2003 | Moriya et al. | 318/85 |
| 6,661,110 B2 | * | 12/2003 | Suzuki et al. | 290/40 C |
| 6,724,169 B2 | * | 4/2004 | Majumdar et al. | 318/811 |
| 6,801,019 B2 | * | 10/2004 | Haydock et al. | 322/17 |
| 2003/0089557 A1 | | 5/2003 | Eilinger | |

FOREIGN PATENT DOCUMENTS

| | | | |
|---|---|---|---|
| DE | 195 26 491 A1 | | 1/1997 |
| WO | WO 200156133 A1 | * | 8/2001 |
| WO | 01/74699 A1 | | 10/2001 |

* cited by examiner

*Primary Examiner*—Bentsu Ro
*Assistant Examiner*—Antony M Paul
(74) *Attorney, Agent, or Firm*—Kenyon & Kenyon LLP

(57) ABSTRACT

A converter system and method, including: at least one supply module, which provides a unipolar, intermediate circuit voltage; one or more drive modules, which may be powered from the intermediate circuit voltage and each include at least one inverter for powering at least one electric motor; and at least one buffer module for storing energy.

29 Claims, 3 Drawing Sheets

CONVERTER SYSTEM, METHOD, AND CONVERTER

FIELD OF THE INVENTION

The present invention relates to a converter system, method, and a converter.

BACKGROUND INFORMATION

Certain converters for powering electric motors are conventional. In this context, an intermediate circuit voltage provided for powering an inverter is mostly generated from an a.c. network voltage, using a rectifier. During regenerative operation, the energy generated is consumed by a braking resistor, which is supplied current by a brake chopper, i.e., an electronic circuit breaker. The heat generated at the braking resistor must be dissipated, for which appropriate space is provided, in particular for air flow, as well. In addition, a converter is necessary for each electric motor.

SUMMARY

According to an example embodiment of the present invention, an option is provided for powering a plurality of electric motors in a cost-effective and compact manner.

In the case of an adapter device, the converter system includes: at least one supply module, which provides a unipolar, intermediate circuit voltage; one or more drive modules, which may be powered by the intermediate circuit voltage and each include at least one inverter for powering at least one electric motor, e.g., a synchronous motor or an asynchronous motor; and at least one buffer module for storing energy.

It may be provided that the buffer module allows energy generated by the drive modules during regenerative operation to be temporarily stored. In particular, the buffer module may be supplied with energy for periods of time, e.g., during regenerative operation of at least one drive module, and stored energy may be subsequently released by the buffer module to at least the drive modules. The modular construction may provide a further advantage, for in the case of the converter system, the modules are combined according to the application, and therefore, the variety or number of components may be reduced in comparison with a system made of separate converters. Modules in regenerative operation and modules in motive operation are connected by the intermediate circuit and may therefore balance out or equalize energy mutually. In addition, the buffer module does not load the network, because current is only fed to the capacitor of the buffer module when a first critical value of the intermediate circuit voltage is exceeded. Thus, current is supplied in a controlled manner.

In an example embodiment, at least one supply module includes a rectifier for generating d.c. voltage from an a.c. voltage, e.g., from a three-phase a.c. network voltage. In this context, it may be provided that the converter system may be powered by a conventional industrial or domestic a.c. voltage network.

In an example embodiment, at least one supply module includes a feedback unit, or a feedback unit is connectible as a module to the intermediate circuit voltage and the a.c. voltage, e.g., to a three-phase a.c. network voltage, to provide feedback or to feed energy back from the intermediate circuit into the network. In this context, it may be provided that energy, which is generated during regenerative operation and may not be stored by the buffer module, may be fed back into the network. Therefore, the energy costs may be reduced.

In an example embodiment, at least one supply module includes an electronic circuit breaker, which allows passage of or blocks current induced by the intermediate circuit voltage and in the direction of a device connected to an output of the supply module, as a function of the activation of the electronic circuit breaker. In this context, it may be provided that the electronic circuit breaker may be used to control the current for a braking resistor and/or for a buffer module and therefore releases energy to the buffer module as a function of the intermediate circuit voltage.

In an example embodiment, the drive circuit of the electronic circuit breaker is connected to a device for measuring the intermediate circuit voltage. In this context, it may be provided that the activation may be designed to be a function of the intermediate circuit voltage, e.g., that the switching or a pulsed operating mode of the switch may therefore be implemented in response to critical values being exceeded.

In an example embodiment, the buffer module includes a capacitor, of which the capacitance is greater than the sum of that of all the capacitors to which the intermediate circuit voltage is directly applied. In this context, the capacitor of the buffer module may not be directly connected to the intermediate circuit, but via further devices, such as diodes. In the case of this value of the capacitance, it may be provided that a braking resistor having high temperatures and requiring a large unit volume, e.g., for cooling, may be eliminated. In addition, the energy is not subsequently converted into heat but retained by capacitors of the buffer module in the form of electrical energy, which may be fed back to the drive modules connected to the intermediate circuit. Consequently, the energy consumption may be decreased, and the energy costs may be reduced.

In an example embodiment, the buffer module includes a capacitor, of which the capacitance is dimensioned so that during motive operation at nominal load, with the capacitor directly connected to the intermediate circuit, the a.c. voltage component of the intermediate circuit voltage may be less than half as large as the a.c. voltage component with the capacitor not connected in this manner. This characteristic is only used for defining the value of the capacitance of the capacitor. In an example embodiment of the present invention, the capacitor of the buffer module is not directly connected to the intermediate circuit, for it is charged or discharged by further devices, as a function of the intermediate circuit voltage. In the case of this sizing, it may be provided that the buffer module may be designed to have a capacitor, of which the unit volume is small in relation to the sum of the volumes of the intermediate circuit capacitors of the separate converters corresponding to the converter system. In particular, a more cost-effective foil or film capacitor may be used. Thus, the unit volume of the overall converter system may be low, and, all in all, the converter system may be inexpensively manufactured, e.g., when using a supply module having feedback.

In an example embodiment, a buffer module is provided, which is connected to an output of the supply module and includes a capacitor, of which the charging current may be influenced and/or controlled by at least the electronic circuit breaker. In this context, it may be provided that the capacitor may be sized according to the application, and that energy from the capacitor may be fed back to drive modules or optionally to a supply module containing a network feedback unit.

In an example embodiment, buffer module PM includes at least one electrolytic capacitor. In this context, it may be provided that the buffer module may be provided with high capacitances.

In the case of the converter system, to form the converter system: at least one supply module, which provides a unipolar, intermediate circuit voltage; one or more drive modules, which may be powered by the intermediate circuit voltage and each include at least one inverter for powering at least one electric motor, e.g., a synchronous motor or an asynchronous motor; and at least one buffer module for storing energy are at least electrically connectible via a bus system, the bus system including: at least two power cables (+,−) for carrying the intermediate circuit voltage; and a power cable BRC for electrically connecting the supply module(s) to the buffer module(s).

In this context, it may be provided that the bus system may be configured so that different modules are connectible and connected to the intermediate circuit voltage for removing energy or supplying energy to the intermediate circuit.

In an example embodiment, the modules, such as the buffer module or drive modules, the supply module, and, if applicable, further modules each have the same kind of interface for electrical and mechanical connection to the bus system. In particular, the interface is constructed in the same manner in all of the modules. In this context, it may be provided that a system is provided which is highly flexible and may be adapted to the specific applications. For example, a feedback module may be added to an existing converter system, in order to save energy, or a buffer module or a larger buffer module may be connected. In addition, different drive modules may be connected.

In the case of the method, in order to operate a buffer module in a converter system including: at least one supply module VM, which provides a unipolar, intermediate circuit voltage; one or more drive modules AM, which may be powered from the intermediate circuit voltage and each include at least one inverter for powering at least one electric motor; and at least one buffer module PM for storing energy, the intermediate circuit voltage is measured; and in response to a first critical value of the intermediate circuit voltage being exceeded, buffer module PM is supplied with energy, when the overall regenerative power of first drive modules exceeds the motive power of second drive modules; the buffer module feeds back energy to the modules powered by the intermediate circuit voltage, when the total motive power of drive modules exceeds the regenerative power. In this context, it may be provided that the intermediate circuit voltage is monitored, several drive modules being connected which may transmit energy via the intermediate circuit. Thus, the number of cases in which the intermediate circuit voltage exceeds a critical value may be reduced. In addition, a single buffer module, which may be selected to be smaller than the sum of the capacitances of the intermediate circuit capacitors of corresponding, separate converters when appropriately dimensioned, may be used for several drive modules in this manner. This may reduce the costs and the unit volume. Moreover, a single circuit breaker may be sufficient for switching, and it may be sufficient to measure the intermediate circuit voltage only once for several drive modules.

In the case of a second critical value of the intermediate circuit voltage being exceeded, an example embodiment provides for current to flow through a braking resistor to dissipate energy, when the total regenerative power of first drive modules exceeds the motive power of second drive modules. In this context, it may be provided that, in a corresponding application case, the converter system may additionally be provided with a module that includes a braking resistor, and that the intermediate circuit voltage may therefore be kept in the permissible range. In this connection, the critical value for the switching of the braking resistor may be designed to be different from the critical value for the switching of the buffer capacitor. Therefore, energy may be stored in the buffer module in the case of short-term regenerative operation, and consumed in the braking resistor in the case of long-term regenerative operation.

In an example embodiment, the second and first critical values are identical. In this context, it may be provided that the method may be implemented in a simple manner.

According to an example embodiment of the present invention, a converter system includes: at least one supply module configured to provide a unipolar, intermediate circuit voltage; at least one drive module powerable by the intermediate circuit voltage, each drive module including at least one inverter configured to power at least one electric motor; and at least one buffer module configured to store energy.

According to an example embodiment of the present invention, a converter system includes: at least one supply module configured to provide a unipolar, intermediate circuit voltage; at least one drive module powerable by the intermediate circuit voltage, each drive module including at least one inverter configured to power at least one electric motor; at least one buffer module configured to store energy; and a bus system configured to electrically connect the supply module, the drive module and the buffer module, the bus system including at least two power cables configured to carry the intermediate circuit voltage and a power cable configured to electrically connect the supply module to the buffer module.

According to an example embodiment of the present invention, a method for operating a buffer module in a converter system, the converter system including at least one supply module configured to provide a unipolar, intermediate circuit voltage, at least one drive module powerable from the intermediate circuit voltage and including at least one inverter configured to power at least one electric motor, and at least one buffer module configured to store energy, includes: measuring the intermediate circuit voltage; in response to the intermediate circuit voltage exceeding a first critical value, supplying the buffer module with energy when an overall regenerative power of a first drive module exceeds a motive power of a second drive module; and feeding back energy by the buffer module to drive modules powered by the intermediate circuit voltage when a total motive power of the drive modules exceeds the regenerative power.

According to an example embodiment of the present invention, a converter includes: a rectifier configured to generate an intermediate circuit voltage; an inverter configured to be powered by the intermediate circuit voltage; a first capacitor not directly connected to the intermediate circuit voltage configured to be energized by an electronic circuit breaker in a controlled manner as a function of the intermediate circuit voltage, the first capacitor configured to release energy to an intermediate circuit; and a second capacitor directly connected to the intermediate circuit voltage, a capacitance of the first capacitor and a capacitance of the second capacitor configured so that during motive operation at nominal load, with the capacitor directly connected to the intermediate circuit, an a.c. voltage component of the intermediate circuit voltage is less than half an a.c. voltage component with the first capacitor removed.

Figure 1:
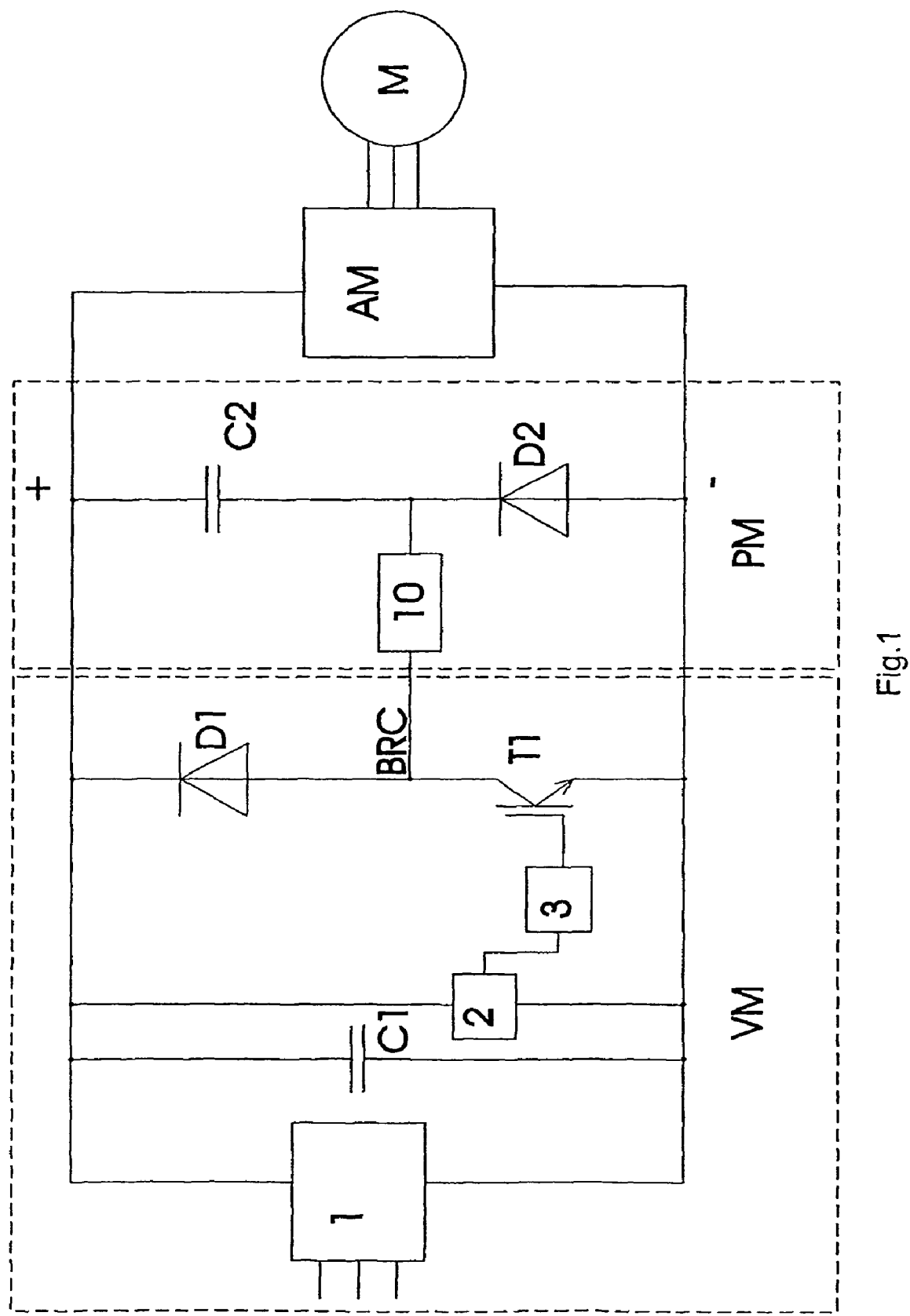
FIG. 1 schematically illustrates a converter system.

| LIST OF REFERENCE NUMERALS | |
|---|---|
| VM | supply module |
| AM | drive module |
| PM | buffer module |
| PVM | integrated buffer/supply module |
| M | electric motor |
| BRC | electrical connecting point |
| 1 | rectifier |
| 2, 23 | device for measuring voltage |
| 3 | drive circuit |
| 10 | charging device |
| 32 | drive circuit |
| 33 | device for measuring current |
| C1 | capacitor |
| C2 | capacitor |
| C3 | capacitor |
| D1, D2, D3 | diodes |
| T1, T2 | electronic circuit breaker |

DETAILED DESCRIPTION

Illustrated in FIG. 1 is a converter system of an example embodiment of the present invention, where a supply module VM includes a rectifier 1, which generates an intermediate circuit voltage (reference symbols +, −) from a three-phase a.c. network voltage, i.e., three-phase voltage, a capacitor C1 being provided for reducing electromagnetic interference. The intermediate circuit voltage is directly applied to capacitor C1.

Device 2 for measuring voltage is connected to drive circuit 3 of electronic circuit breaker T1, which may therefore be reset from the blocked state into the conductive state in response to the intermediate circuit voltage exceeding a critical value. Capacitor C2 may be charged via this electronic circuit breaker T1.

Intermediate circuit voltage (+, −) also powers drive modules AM, which each include converters for powering electric motors, e.g., asynchronous motors or synchronous motors. Also integrated into drive modules AM are electronic circuits, which are used for implementing open-loop and/or closed-loop control methods. Therefore, drive modules AM are similar to converters, except for rectification and intermediate circuit capacitor C1. In addition, the buffer module and, if indicated, further modules, such as the feedback module or a module containing a braking resistor, are also not in the drive module.

Capacitor C2 is charged and the maximum charging current is therefore limited via charging device 10, which may be implemented as an electrical resistor.

In other exemplary embodiments of the present invention, inductive elements or combinations of inductive elements and electrical resistors are provided as charging device 10.

The capacitance of capacitor C1 is selected to be so low that, during rated, motive operation, and in the case of a disconnected buffer module, the alternating component of the intermediate circuit voltage is substantially equal to the alternating component that would be present if capacitor C1 were not present. The capacitor C1 is not implemented in the form of an electrolytic capacitor, but may be implemented as, e.g., a foil or film capacitor. In the case of a connected buffer module in rated operation, the alternating component of the intermediate circuit voltage substantially does not change, as long as all of the drive modules are in motive operation. Only when the intermediate circuit voltage exceeds a first critical value as a result of regenerative operation, is the buffer module charged with energy and the energy fed back into the intermediate circuit after the end of regenerative operation. In the case of a 400 V three-phase network, which may be conventional, this value is over 600 V, e.g., 800 V or more.

Capacitor C2 is designed as an electrolytic capacitor. The magnitude of its capacitance is such that, in the event of capacitor C1 being replaced by C2, the intermediate circuit voltage may be smoothed out such that the alternating component may be less than half as large as in the aforementioned case. However, this direct connection with the intermediate circuit may load the network, since large charging currents are generated in the case of an uncharged capacitor. In particular, it may then also be necessary to limit the charging current, e.g., with the aid of a charging resistor. In the present exemplary embodiment of the present invention, capacitor C2 is not directly connected to the intermediate circuit voltage, but only indirectly connected to it via further devices, such as via charging device 10 and the electronic circuit breaker. In example embodiments of the present invention, capacitor C2 is connected to the intermediate circuit voltage by other or further device(s), but never directly.

In the exemplary embodiment illustrated in FIG. 1, the capacitor is supplied with energy in regenerative operation, when the intermediate circuit voltage has exceeded a critical value. When several drive modules are connected, there are operating states in which a portion of the drive modules are regeneratively operated and another portion motively operated. It may be important whether on the whole, energy is supplied to the intermediate circuit, i.e., the intermediate circuit voltage increases, or energy is removed from the intermediate circuit.

In FIG. 1, the electrical connecting point is denoted by reference symbol BRC. Buffer module PM having charging device 10 is connected to this.

Diode D1 has the function of protecting the components, e.g., electronic circuit breaker T1, diode D1 acting as a freewheeling diode for charging device 10. Diode D2 allows the stored energy of capacitor C2 to be released to the intermediate circuit while it discharges, in that current flows through diode D2.

Figure 2:
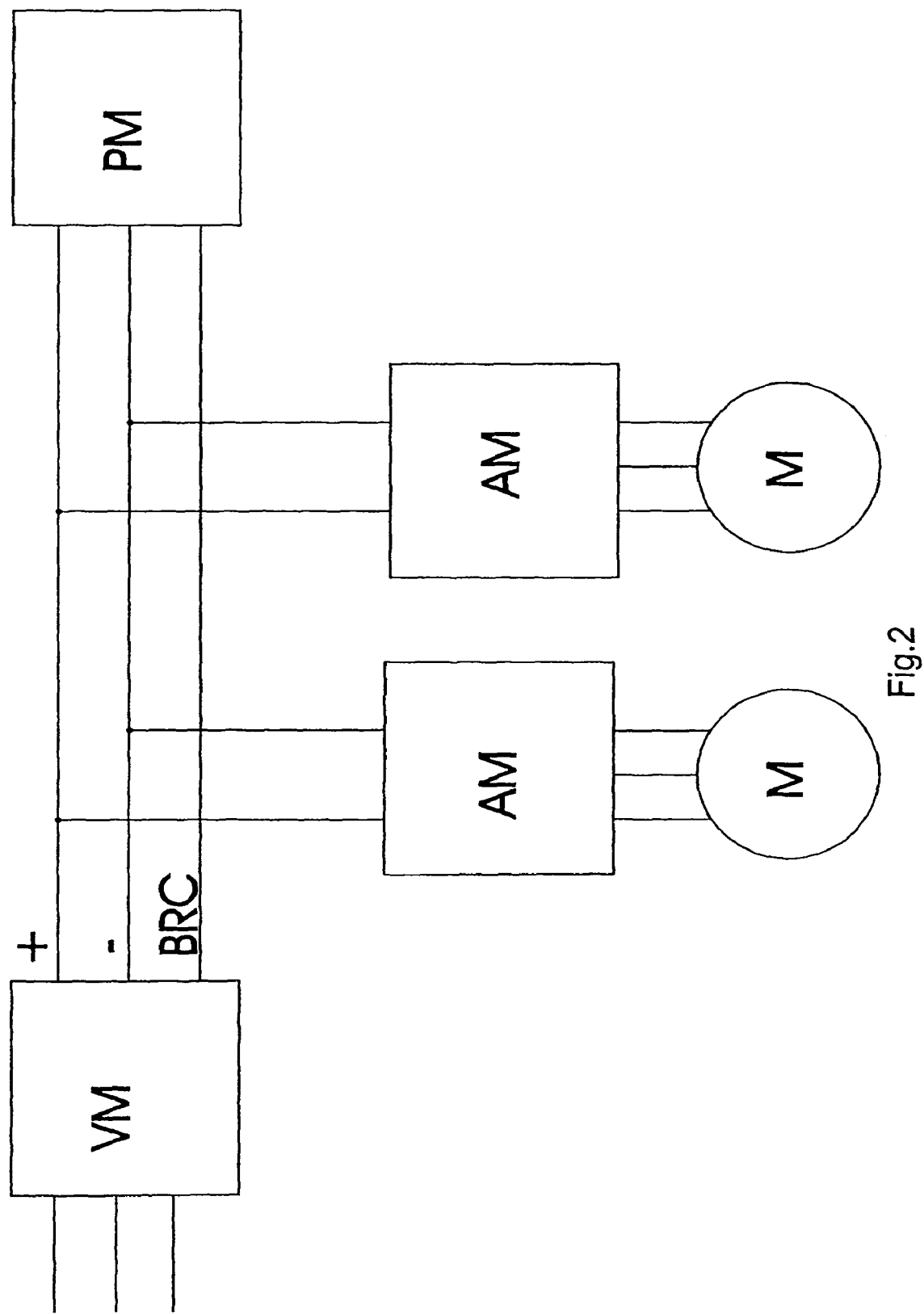
FIG. 2 schematically illustrates a converter system having two drive modules.

A converter system of an example embodiment of the present invention having two drive modules is illustrated in FIG. 2. The intermediate circuit, including the two lines + and − for the intermediate circuit voltage and line BRC for conducting buffer current through to the buffer module, is arranged as a bus system to which the drive modules are connected by their respective interfaces.

Therefore, to form the converter system, at least one supply module VM, which provides a unipolar, intermediate circuit voltage, one or more drive modules AM, which may be powered by the intermediate circuit voltage and each include at least one inverter for powering at least one electric motor, e.g., a synchronous motor or an asynchronous motor, and at least one buffer module PM for storing energy may be electrically and mechanically connected via the bus system, the bus system including: at least two power cables (+,−) for carrying the intermediate circuit voltage; and a power cable BRC for electrically connecting the supply module(s) to the buffer module(s).

In this context, the bus system may be implementable as a rail system, into which modules are insertable. To that end, the modules, such as buffer module PM or buffer modules, drive modules AM, supply module VM, and, if applicable, further modules each have an interface for electrical and mechanical connection to the bus system. In particular, this interface may be constructed in the same manner in all of the modules. Instead of a rail system, bus systems operating in the same manner may also be used. However, a bus system, which is suitably constructed for receiving the above-mentioned and, in each case, the identically stamped interface at various discrete positions or even an infinite number of positions, may be used.

In an exemplary embodiment of the present invention, the supply module may include a network feedback unit. In an exemplary embodiment of the present invention, the network feedback unit may also be constructed as an independent module having, the same kind of interface for connection to the bus system.

In particular, the method of an example embodiment of the present invention for directing energy from the intermediate circuit to a capacitor having a large capacitance may also be realized with the aid of a single converter.

Figure 3:
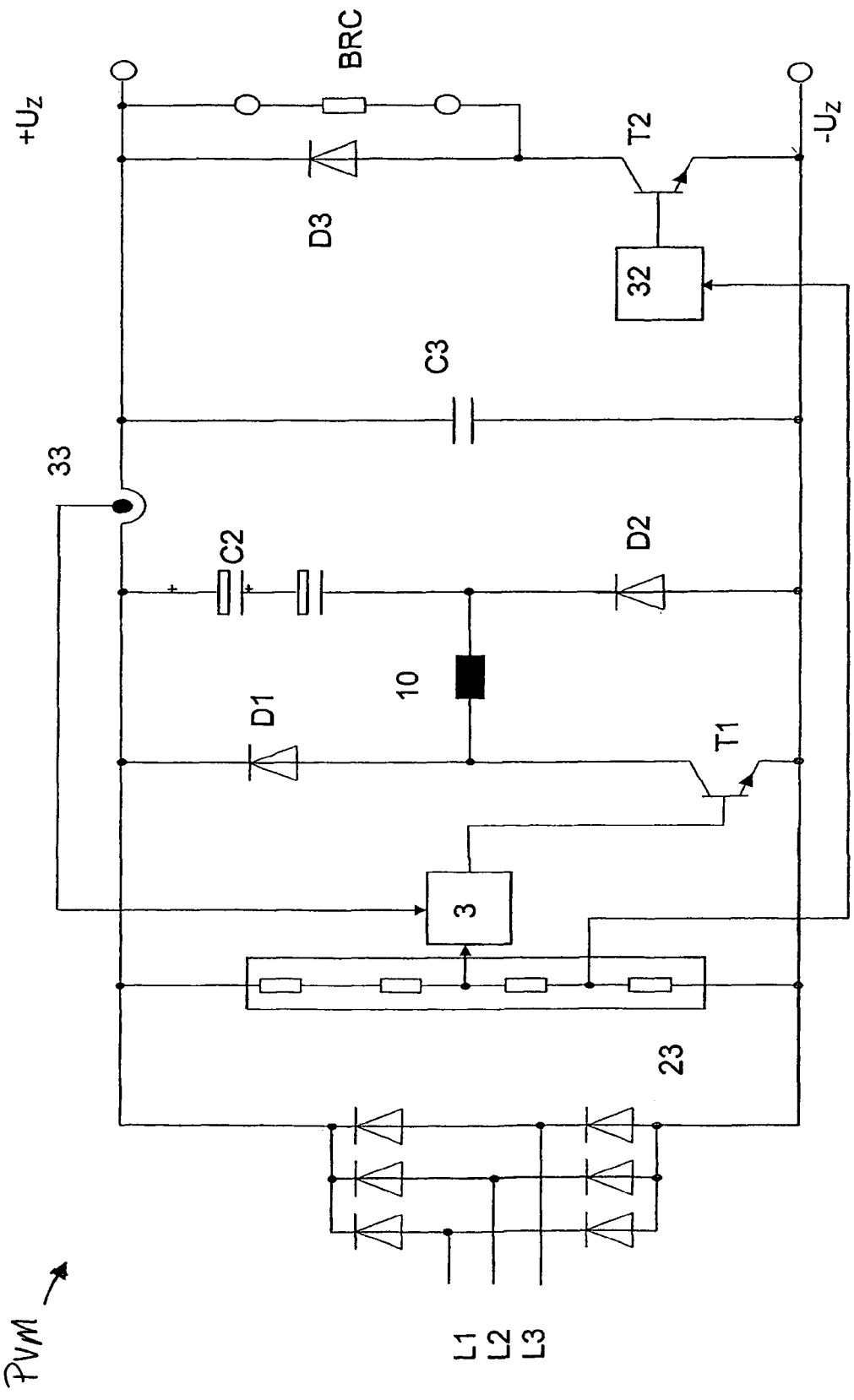
FIG. 3 schematically illustrates an integrated buffer/supply module.

Illustrated in FIG. 3 is an integrated buffer/supply module PVM, in which the characteristics of supply module VM and buffer module PM are included. In addition, further characteristics are realized in this integration:

A device 23 for measuring the intermediate circuit voltage and a device for measuring the intermediate circuit current 33 are connected to drive circuit 3 for electronic circuit breaker T1. Therefore, the intermediate circuit current may also be considered during the triggering of electronic circuit breaker T1. In particular, a value of the loading of electronic circuit breaker T1 is ascertainable from these measured values of intermediate circuit voltage and intermediate circuit current, and the electronic circuit breaker may therefore be protected from overload. A further result of this is that inductor 10 may be sized to be the smaller, because the maximum expected currents for inductor 10 may be co-determined by switch T1.

The determination of the intermediate circuit current is also used for another purpose, e.g., for the overload protection of buffer/supply module PVM, i.e., for example, for the supply module part and the charging of the buffer.

Capacitor C3 is arranged as an intermediate circuit capacitor. In exemplary embodiments of the present invention, it may be implemented, e.g., as a cost-effective film capacitor and not as an electrolytic capacitor.

During regenerative operation, the intermediate circuit voltage increases until the voltage threshold value of drive circuit 3 is reached. When this value is exceeded, the electronic circuit breaker is reset to the conductive state by drive circuit 3. Therefore, the current for charging capacitor C2 flows through inductor 10 and is measured by device for measuring intermediate circuit current 33. If the current value determined in this manner reaches a critical value, electronic circuit breaker T1 is switched off. The charging current for capacitor C2 then continues to flow through inductor 10 and freewheeling diode D1 until the energy of the coil has substantially gone over to the capacitor. During the described charging cycle, the intermediate circuit voltage decreases a little until electronic circuit breaker T1 is switched off. After the switching-off point, the intermediate circuit voltage increases again and the described charging cycle is repeated.

A device for measuring voltage 23 provides a second, further stepped-down value, which is a function of the intermediate circuit voltage and is transmitted to drive circuit 32 of electronic circuit breaker T2. At their inputs, drive circuits 3 and 32 have the same threshold voltage values, as a function of which electronic circuit breakers T1 and T2 are activated. This allows the buffer capacitor, i.e., capacitor C2, to initially be charged in a simple manner, and then allows the electronic circuit breaker to be switched into a conductive state only in response to a further increase in the intermediate circuit voltage, so that intermediate circuit current is drawn off by braking resistor BRC. Consequently, the braking resistor connected to outer terminals BRC may be supplied with energy as a function of the intermediate circuit voltage. A freewheeling diode D3 is connected in parallel with braking resistor BRC, since as a result, braking resistors, which have leads and have not only ohmic components but also inductive components, may also be used.

In exemplary embodiments of the present invention, buffer/supply module PVM is arranged so that terminals BRC are integrated and the braking resistor is situated in the interior of buffer/supply module PVM.

What is claimed is:

1. A converter system, comprising:
   at least one supply module configured to provide a unipolar, intermediate circuit voltage;
   at least one drive module powerable by the intermediate circuit voltage, each drive module including at least one inverter configured to power at least one electric motor;
   at least one buffer module configured to store energy; and
   a power cable electrically connecting the supply module to the buffer module;
   wherein the buffer module is configured to be supplied with energy for periods of time when the intermediate circuit voltage exceeds a first critical value and an overall regenerative power of a first drive module exceeds a motive power of a second drive module to store the supplied energy, and to supply the stored energy to at least one drive module when a total motive power of the at least one drive module exceeds the regenerative power to power the corresponding electric motor;
   wherein the buffer module includes a capacitor and a diode, and a cathode of the diode is directly connected to a negative plate of the capacitor.

2. The converter system according to claim 1, wherein the electric motor includes one of (a) a synchronous motor and (b) an asynchronous motor.

3. The converter system according to claim 1, wherein the buffer module is configured to be supplied with energy for periods of time and to subsequently release stored energy to at least the drive module.

4. The converter system according to claim 1, wherein the buffer module is configured to be supplied with energy for periods of time during regenerative operation of at least one drive module and to subsequently release stored energy to at least the drive module.

5. The converter system according to claim 1, wherein at least one supply module includes a rectifier configured to generate a d.c. voltage from an a.c. voltage.

6. The converter system according to claim 1, wherein at least one supply module includes a rectifier configured to generate a d.c. voltage from an a.c. voltage from a three-phase a.c. network voltage.

7. The converter system according to claim 1, wherein one of:
   (a) at least one supply module includes a feedback unit; and
   (b) the converter system further comprises a feedback unit connected to the intermediate circuit voltage and an a.c. voltage.

8. The converter system according to claim 1, wherein one of:
   (a) at least one supply module includes a feedback unit; and
   (b) the converter system further comprises a feedback unit connected to the intermediate circuit voltage and a three-phase a.c. network voltage.

9. The converter system according to claim 1, wherein at least one supply module includes an electronic circuit breaker configured to allow passage of and to block, as a function of activation of the electronic circuit breaker, current induced by the intermediate circuit voltage and in a direction of a device connected to an output of the supply module.

10. The converter system according to claim 9, wherein a drive circuit of the electronic circuit breaker is connected to a device configured to measure the intermediate circuit voltage.

11. The converter system according to claim 1, wherein a capacitance of the capacitor is greater than a sum of capacitance of all other capacitors to which the intermediate circuit voltage is directly applied.

12. The converter system according to claim 1, wherein the buffer module is arranged as a device connected to an output of the supply module, the buffer module including a capacitor having a charging current,
wherein the charging current is at least one of:
(a) influenceable by at least an electronic circuit breaker; and
(b) controllable by at least an electronic circuit breaker.

13. The converter system according to claim 1, wherein the buffer module includes at least one electrolytic capacitor.

14. The converter system according to claim 1, wherein the buffer module and the supply module are manufactured separately, each of the buffer module and the supply module including a respective housing.

15. The converter system according to claim 1, wherein the buffer module and the supply module are integrated into a buffer/supply module and arranged in a single housing.

16. The converter system according to claim 15, wherein the buffer/supply module includes an electronic circuit breaker configured to allow passage of and block, as a function of activation of the electronic circuit breaker, current induced by the intermediate circuit voltage and in a direction of a device.

17. The converter system according to claim 16, wherein a drive circuit of the electronic circuit breaker is connected to a device configured to measure the intermediate circuit voltage.

18. The converter system according to claim 16, wherein a drive circuit of the electronic circuit breaker is connected to a device configured to measure an intermediate circuit current.

19. The converter system according to claim 1, wherein the buffer module includes an electronic circuit breaker and a corresponding drive circuit at least connected to a device configured to measure voltage, the electronic circuit breaker configured to influence supply of current to a braking resistor.

20. A converter system, comprising:
at least one supply module configured to provide a unipolar, intermediate circuit voltage;
at least one drive module powerable by the intermediate circuit voltage, each drive module including at least one inverter configured to power at least one electric motor; and
at least one buffer module configured to store energy,
wherein a capacitor of the supply module directly connected to the intermediate circuit voltage and a capacitor included in the buffer module are configured so that during motive operation at a nominal load, with the capacitor of the buffer module directly connected to the intermediate circuit voltage, an a.c. voltage component of the intermediate circuit voltage is less than half an a.c. voltage component with the buffer module removed together with the capacitor of the buffer module.

21. A converter system, comprising:
at least one supply module configured to provide a unipolar, intermediate circuit voltage;
at least one drive module powerable by the intermediate circuit voltage, each drive module including at least one inverter configured to power at least one electric motor;
at least one buffer module configured to store energy; and
a bus system configured to electrically connect the supply module, the drive module and the buffer module, the bus system including at least two power cables configured to carry the intermediate circuit voltage and a power cable configured to electrically connect the supply module to the buffer module,
wherein the buffer module is configured to be supplied with energy for periods of time when the intermediate circuit voltage exceeds a first critical value and an overall regenerative power of a first drive module exceeds a motive power of a second drive module to store the supplied energy, and to supply the stored energy to at least one of the drive modules when a total motive power of the drive modules exceeds the regenerative power to power the corresponding electric motor;
wherein the buffer module includes a capacitor and a diode, and a cathode of the diode is directly connected to a negative plate of the capacitor.

22. The converter system according to claim 21, wherein the electric motor includes one of (a) a synchronous motor and (b) an asynchronous motor.

23. The converter system according to claim 21, wherein the buffer module, the drive module and the supply module include an interface configured to electrically and mechanically connect to the bus system.

24. The converter system according to claim 23, further comprising at least one further module including an interface configured to electrically and mechanically connect to the bus system.

25. The converter system according to claim 23, wherein the interface of each of the buffer module, the drive module and the supply module is the same.

26. A method for operating a buffer module in a converter system, the converter system including at least one supply module configured to provide a unipolar, intermediate circuit voltage, at least one drive module powerable from the intermediate circuit voltage and including at least one inverter configured to power at least one electric motor, at least one buffer module configured to store energy, and a power cable electrically connecting the supply module to the buffer module, comprising:
measuring the intermediate circuit voltage;
in response to the intermediate circuit voltage exceeding a first critical value, supplying the buffer module with energy when an overall regenerative power of a first drive module exceeds a motive power of a second drive module to store the supplied energy; and
supplying the stored energy by the buffer module to at least one of the drive modules powered by the intermediate circuit voltage when a total motive power of the drive modules exceeds the regenerative power to power the corresponding electric motor;
wherein the buffer module includes a capacitor and a diode, and a cathode of the diode is directly connected to a negative plate of the capacitor.

27. The method according to claim 26, further comprising, in response to the intermediate circuit voltage exceeding a second critical value, flowing current through a braking resistor to dissipate energy when a total regenerative power of first drive modules exceeds the motive power of second drive modules.

28. The method according to claim 27, wherein the first critical value and the second critical value are equal.

29. A converter, comprising:
a rectifier configured to generate an intermediate circuit voltage;
an inverter configured to be powered by the intermediate circuit voltage;
a first capacitor not directly connected to the intermediate circuit voltage configured to be energized by an electronic circuit breaker in a controlled manner as a function of the intermediate circuit voltage, the first capacitor configured to release energy to an intermediate circuit; and
a second capacitor directly connected to the intermediate circuit voltage, a capacitance of the first capacitor and a capacitance of the second capacitor configured so that during motive operation at nominal load, with the capacitor directly connected to the intermediate circuit, an a.c. voltage component of the intermediate circuit voltage is less than half an a.c. voltage component with the first capacitor removed.

* * * * *